(12) United States Patent
Plondke (10) Patent No.: US 10,108,487 B2
(45) Date of Patent: Oct. 23, 2018

(54) PARITY FOR INSTRUCTION PACKETS

(71) Applicant: QUALCOMM Incorporated, San Diego, CA (US)

(72) Inventor: Erich James Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/192,981

(22) Filed: Jun. 24, 2016

(65) Prior Publication Data

US 2017/0371739 A1 Dec. 28, 2017

(51) Int. Cl.
*G06F 11/10* (2006.01)
*G06F 9/30* (2018.01)
*G06F 12/0875* (2016.01)

(52) U.S. Cl.
CPC ...... *G06F 11/1048* (2013.01); *G06F 9/30145* (2013.01); *G06F 11/10* (2013.01); *G06F 11/1032* (2013.01); *G06F 12/0875* (2013.01); *G06F 2212/452* (2013.01)

(58) Field of Classification Search
CPC .. G06F 11/10; G06F 11/1012; G06F 11/1032; G06F 11/1064; G06F 9/30145; G06F 12/0875; G06F 11/1048
See application file for complete search history.

(56) References Cited

U.S. PATENT DOCUMENTS

| | | | |
|---|---|---|---|
| 4,005,405 A | 1/1977 | West | |
| 6,041,430 A * | 3/2000 | Yamauchi | G06F 11/1012 714/752 |
| 6,738,892 B1 | 5/2004 | Coon et al. | |
| 7,013,454 B2 | 3/2006 | Bush et al. | |
| 7,240,277 B2 | 7/2007 | Anderson et al. | |
| 7,302,619 B1 * | 11/2007 | Tompkins | G06F 11/1064 712/231 |
| 7,370,230 B1 | 5/2008 | Flake | |
| 7,447,948 B2 * | 11/2008 | Galbi | G06F 11/1032 714/2 |

(Continued)

OTHER PUBLICATIONS

Silberman et al., An architectural framework for supporting heterogeneous instruction set architectures, Jun. 1993, IEEE, pp. 39-56.*

(Continued)

*Primary Examiner* — Shelly A Chase (74) *Attorney, Agent, or Firm* — Muncy, Geissler, Olds & Lowe, P.C./Qualcomm (57) ABSTRACT

Systems and method of error checking for instructions method of error checking for instructions include an assembler for creating an instruction packet with one or more instructions, determining if a parity of the instruction packet matches a predesignated parity, and if the parity of the instruction packet does not match the predesignated parity, using a bit of the instruction packet to change parity of the instruction packet to match the predesignated parity. The instruction packet with the predesignated parity is stored in a memory, and may eventually be retrieved by a processor for execution. If there is an error in the instruction packet retrieved from the memory, the error is detected based on comparing the parity of the instruction packet to the predesignated parity.

30 Claims, 4 Drawing Sheets

(56) References Cited

U.S. PATENT DOCUMENTS

| | | | | |
|---|---|---|---|---|
| 8,135,927 B2* | 3/2012 | Bybell | ............... | G06F 12/0895 |
| | | | | 711/118 |
| 8,201,067 B2* | 6/2012 | Busaba | .................. | G06F 11/10 |
| | | | | 712/228 |
| 8,904,260 B2 | 12/2014 | Tran et al. | | |
| 2008/0256419 A1 | 10/2008 | Wojewoda et al. | | |
| 2014/0089755 A1* | 3/2014 | Kantamsetti | ........ | G06F 11/1048 |
| | | | | 714/748 |
| 2014/0244932 A1* | 8/2014 | Hebbar | .............. | G06F 12/0875 |
| | | | | 711/122 |

OTHER PUBLICATIONS

International Search Report and Written Opinion—PCT/US2017/035713—ISA/EPO—dated Oct. 26, 2017.

\* cited by examiner

PARITY FOR INSTRUCTION PACKETS

FIELD OF DISCLOSURE

Disclosed aspects relate to instruction processing in a processing system. More specifically, exemplary aspects relate to the use of parity bits for detecting errors in instruction packets.

BACKGROUND

In a conventional architecture of a processor, the processor can receive one or more instructions in a processing cycle, from a storage location such as an instruction cache or main memory. In each processing cycle, the processor can execute one or more instructions in parallel in one or more execution units. Bit flips or errors can occur in any instruction of the one or more instructions, in any of the stages or components involved in the instruction's lifecycle, such as storage, transfer, execution, etc. of the instruction.

For example, the storage locations such as caches or main memory can be implemented using technology such as static random access memory (SRAM), double data rate (DDR) memory, etc., which may be prone to errors. Bit flips can also be introduced in the various network buses and wires involved in transferring the instruction from the storage locations to the processor's execution units. Furthermore, the execution units may also contribute to logic errors while operating on the instruction.

Adding error checks in each stage of the instruction's lifecycle may be expensive and in some cases, impractical. For example, adding parity information to each cache line of an instruction cache or each storage location in main memory/DDR may be expensive, and even if errors in the storage locations can be detected (and in some cases, corrected), bit flips may be introduced downstream in the processing of the instruction. Furthermore, it may not be possible to add error checking mechanisms for each of the buses which transport the instruction, or for each execution unit which operates on the instruction. Therefore, pinpointing the source of an error may be difficult, and if the errors are left unchecked, the errors can result in various exceptions or system faults.

Accordingly, there is a corresponding need for effective error checking mechanisms which can provide an end-to-end solution for errors introduced in any stage of an instruction's lifecycle and in any component storage locations or transport between storage locations for the instruction.

SUMMARY

Exemplary aspects of the invention are directed to systems and methods for error checking for instructions. An assembler creates an instruction packet with one or more instructions, determines if a parity of the instruction packet matches a predesignated parity, and if the parity of the instruction packet does not match the predesignated parity, uses a bit of the instruction packet to change parity of the instruction packet to match the predesignated parity. The instruction packet with the predesignated parity is stored in a memory, and may eventually be retrieved by a processor for execution. If there is an error in the instruction packet retrieved from the memory, the error is detected based on comparing the parity of the instruction packet to the predesignated parity. In this manner, end-to-end error checking capability is provided for the instruction packet.

Accordingly, an exemplary aspect is directed to a method of error checking for instructions, the method comprising: creating an instruction packet with one or more instructions, determining if a parity of the instruction packet matches a predesignated parity, and if the parity of the instruction packet does not match the predesignated parity, using a bit of the instruction packet to change parity of the instruction packet to match the predesignated parity. The instruction packet with the predesignated parity is stored in a memory, and if there is an error in the instruction packet retrieved from the memory, the error is determined based on comparing the parity of the instruction packet to the predesignated parity.

Another exemplary aspect is directed to an apparatus comprising a processor configured to create an instruction packet with one or more instructions, determine if a parity of the instruction packet matches a predesignated parity, and if the parity of the instruction packet does not match the predesignated parity, use a bit of the instruction packet to change parity of the instruction packet to match the predesignated parity. A memory is configured to store the instruction packet with the predesignated parity and if there is an error in the instruction packet retrieved from the memory, the error is determined based on comparing the parity of the instruction packet to the predesignated parity in a parity check block of the processor.

Yet another exemplary aspect is directed to an apparatus comprising: means for creating an instruction packet with one or more instructions, means for determining if a parity of the instruction packet matches a predesignated parity, and if the parity of the instruction packet does not match the predesignated parity, means for using a bit of the instruction packet to change parity of the instruction packet to match the predesignated parity. The apparatus further comprises means for storing the instruction packet with the predesignated parity, and if there is an error in the instruction packet retrieved from the memory, means for determining the error based on a comparison of the parity of the instruction packet to the predesignated parity.

Yet another exemplary aspect is directed to a non-transitory computer readable storage medium comprising code, which, when executed by a processor, causes the processor to perform a method of error checking for instructions, the non-transitory computer readable storage medium comprising code for creating an instruction packet with one or more instructions, code for determining if a parity of the instruction packet matches a predesignated parity, if the parity of the instruction packet does not match the predesignated parity, code for using a bit of the instruction packet to change parity of the instruction packet to match the predesignated parity, and code for storing the instruction packet with the predesignated parity in a memory. The non-transitory computer readable storage medium further comprises code for determining if there is an error in the instruction packet retrieved from the memory, based on comparing the parity of the instruction packet to the predesignated parity.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In exemplary aspects of this disclosure, mechanisms for error checks for instructions may be built in to the instructions themselves, (wherein it is recognized that conventional instructions do not have error checking capabilities such as parity bits built in or encoded in the instructions). For example, considering an instruction packet which comprises a group or block of one or more instructions, there is a high likelihood of there being some unused bits in the instruction packet. The unused bits may be architecturally reserved bits, unused bits in portions of an instruction word or cache line which are not used up by the block of instructions, bit patterns which may be ignored by hardware/execution units, etc. One or more of the unused bits in an instruction packet can be used for the purposes of error detection in exemplary aspects. For example, an unused bit may be repurposed as a parity bit (e.g., by an assembler) i.e., changed to make up the parity of the instruction packet to match a predesignated parity, e.g., odd or even. The instruction packet may then be stored in memory (e.g., main memory such as DDR, Flash memory, random access memory (RAM), etc.), and subsequently supplied to an instruction cache, for example, from which the instruction packet may be retrieved for execution by a processor. If the parity of the instruction packet does not match the predesignated parity (e.g., as detected by hardware) at any point in the above processes, then it may be determined that the instruction packet has an error.

Based on the parity created from an unused bit in the above manner, if an error is detected in an instruction packet (i.e. parity of the instruction packet does not match the predesignated parity), then various courses of action are possible. In some cases, the instruction packet may be marked as having an error and be recorded for future analysis or recovery.

In some cases, even if an instruction packet does not have unused bits, it may still be possible to incorporate a parity bit in the instruction packet according to exemplary aspects. For example, an instruction packet may comprise instructions in the form of a Very Long Instruction Word (VLIW) as known in the art, wherein, two or more instructions are provided together as a VLIW packet. The two or more instructions in VLIW packet are designed to be executed in parallel. If there are one or more unused bits in the VLIW packet, then an unused bit of the one or more unused bits may be used to change the VLIW packet's parity to the predesignated or expected parity (e.g., odd or even). However, if there are no unused bits, but if there are less than the maximum number of instructions that are possible to be grouped into a single VLIW packet, then a no-operation (NOP) field (i.e., a dummy instruction which is not executed) can be added to the VLIW packet, and a bit of the NOP field can be used as a parity bit. Other architecturally reserved fields, such as bit patterns which may designate the end of a VLIW packet, for example, can also be used for creating a parity bit in cases where unused bit fields are not readily available.

The above and other exemplary aspects will now be discussed with reference to the figures below. The example of a VLIW packet will be used to explain some exemplary aspects, but it will be understood that aspects of this disclosure can be easily extended to any other instruction format for an instruction packet comprising one or more instructions.

Figure 1:
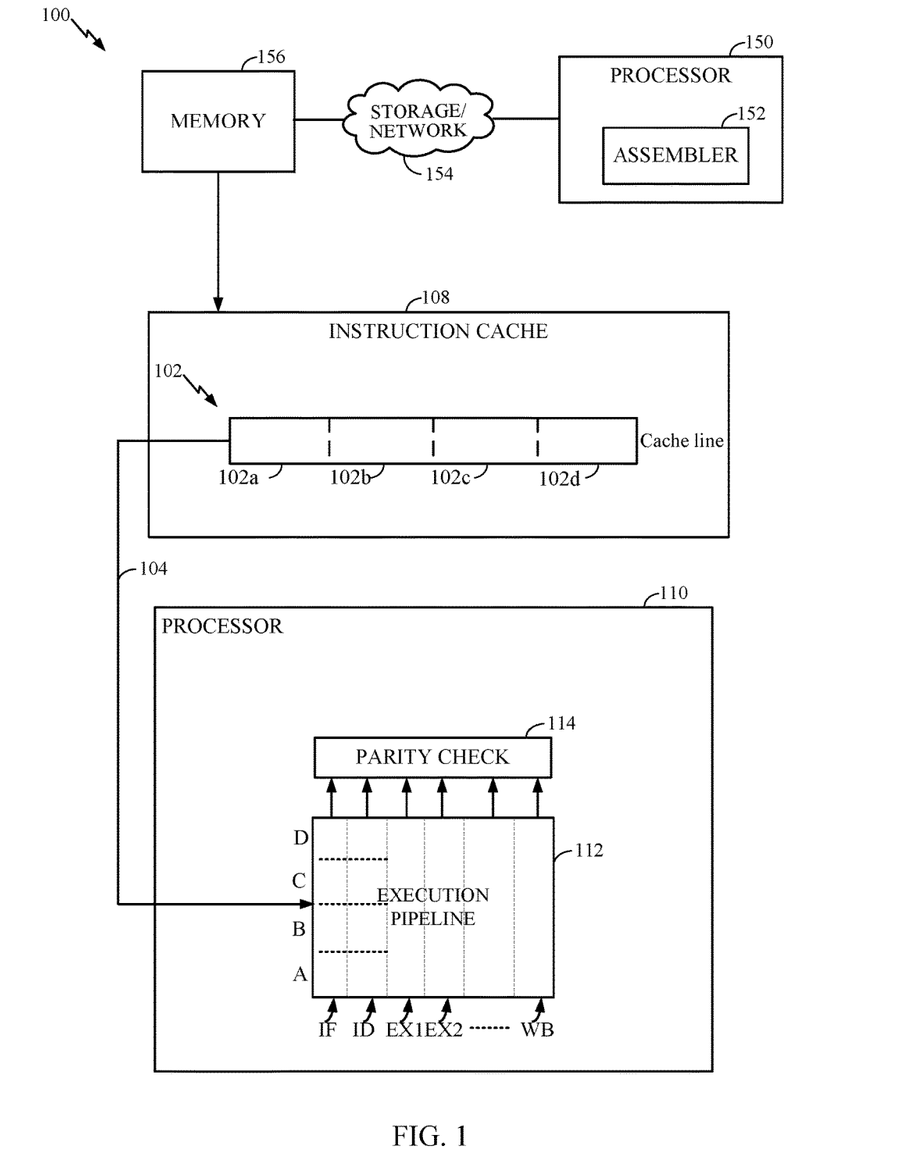
FIG. 1 illustrates a processing system according to an aspect of this disclosure.

With reference now to FIG. 1, a schematic representation of an exemplary processing system 100 is illustrated. As shown, processing system 100 can include processor 150 which can comprise assembler 152 used for creating parity in instruction packets according to aspects of this disclosure. Assembler 152 may be implemented in software and used for assembling instructions to be executed by a processor such as processor 110. Although processor 150 and processor 110 have been shown separately, this is merely for the sake of illustration, and in various implementations, processors 150 and 110 may be the same processor or processing unit which executes an assembler as well as comprises execution units for downstream execution of instructions generated by the assembler.

As shown, instructions and/or instruction packets generated by assembler 152 may pass through intermediate networks/storage media (generally identified by the reference numeral 154) and be stored in memory 156, which may be a main memory (e.g., DDR), Flash memory, RAM, etc. From memory 156, instructions may be provided to instruction cache 108 (e.g., based on various demand-based fetches, prefetches, or combinations thereof, as known in the art).

Processor 110 is shown to be coupled to instruction cache 108. Processor 110 may be configured to receive instructions from instruction cache 108 and execute the instructions using, for example, execution pipeline 112. One or more other caches such as a data cache, level 2 (L2) caches, etc., as known in the art, may also be present in processing system 100, but these have also not been illustrated, for the sake of simplicity.

In processor 110, execution pipeline 112 is shown, which may include one or more pipelined stages, representatively illustrated as: an instruction fetch (IF) stage, an instruction decode (ID) stage, one or more execution (EX1, EX2, etc.) stages, and a write back (WB) stage. Skilled persons will recognize numerous modifications and additions to execution pipeline 112, as known in the art.

In one aspect, instruction cache 108 can comprise several cache lines, of which cache line 102 has been representatively shown. Cache line 102 can comprise one or more instructions or an instruction packet formed by one or more instructions. It will be understood that more than one instructions or instruction packets, or combinations thereof can be included in a single cache line; and moreover, an instruction or an instruction packet may span more than one cache lines. However, the various arrangements of instructions and/or instruction packets in one or more cache lines have not been exhaustively described for the sake of simplicity of disclosure, keeping in mind that disclosed aspects are applicable to the various possible arrangements of instructions and/or instruction packets in one or more cache lines. As shown, cache line 102 includes a set of instructions 102a-d, which can be VLIW instructions. Instructions 102a-d can occupy lanes A-D respectively, wherein execution pipeline 112 may be configured to execute one instruction at a time, or in the case of VLIW instructions, act on two or more instructions in two or more lanes A-D simultaneously or in parallel. Instructions 102a-d may be provided to execution pipeline 112 through various interconnections and buses which are collectively represented as bus 104 in FIG. 1.

As can be appreciated, bit errors or bit flips can arise in any instruction of instructions 102a-d, wherein these errors may arise in their storage location, e.g., in instruction cache 108; in their transport, e.g., on bus 104; or during their execution in execution pipeline 112. The collective parity of a VLIW packet comprising instructions 102a-d is expected to match a predesignated parity (e.g., odd or even parity). In an exemplary aspect, if the collective parity of the VLIW packet comprising instructions 102a-d did not originally match the predesignated parity, then the parity of the VLIW packet may have been changed (e.g., by assembler 152 or other software) to match the predesignated parity (e.g., odd or even parity) by using unused bits. Various examples of such unused bits which can be used for changing the parity of the VLIW packet to match the predesignated parity in this manner, will be explained with reference to FIG. 2.

In FIG. 1, the block designated as parity check 114 may be provided to check if the parity of the VLIW packet deviates from the predesignated parity. As shown, the instructions 102a-d of the VLIW packet may be supplied from any one of the stages of execution unit to parity check 114 for various implementations. If the parity of the VLIW packet deviates from the predesignated parity, then parity check 114 may trigger an error. As may be understood by one skilled in the art, when using a single bit for parity, a single bit error may be detected. Thus, parity check 114 may include logic for detecting a single bit error based on parity of instructions supplied, for example, from execution unit 112. Similar parity checking logic can be added to any other component or stage of processing system 100 to check for parity and errors, if any, at any point in the lifecycle of instructions such as instructions 102a-d. Although not discussed in detail herein, it is possible to extend the above aspects of error checking for single bit errors to more complex error detection and, in some cases, error correction (e.g., by implementing error correction code (ECC)) which can detect and in some cases, also correct errors in more than one bit. Such complex error detection and correction techniques may be applicable to cases where multiple unused bits are found within an instruction packet and used by assembler 152 for creating ECC bits, for example.

Figure 2:
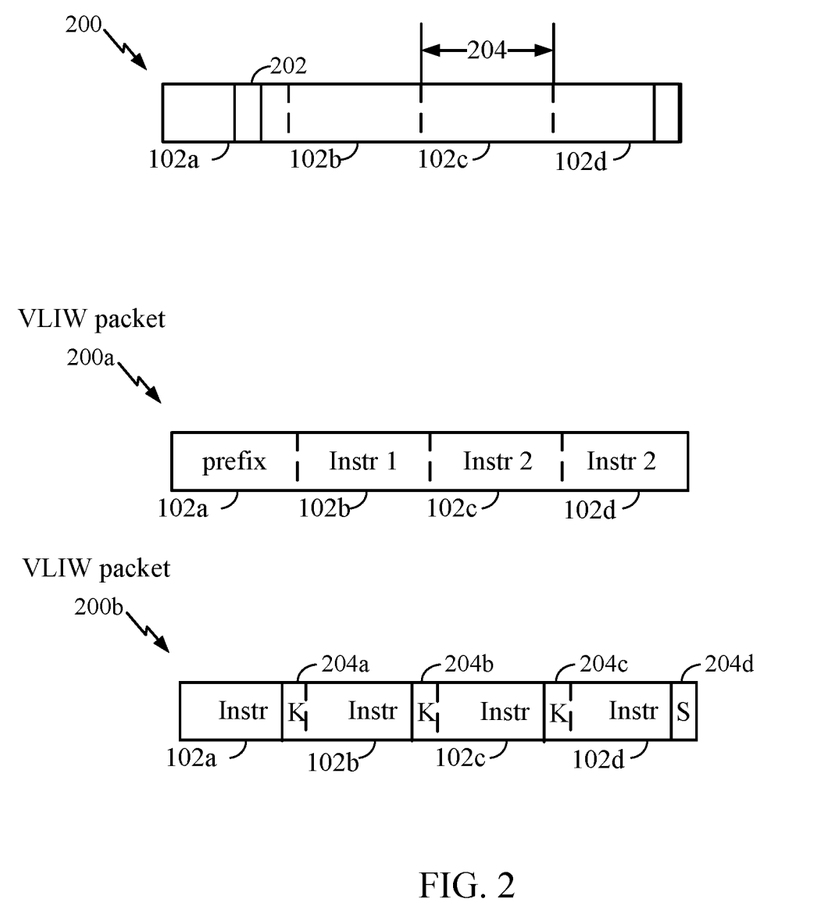
FIG. 2 illustrates example instruction packets according aspects of this disclosure.

With reference now to FIG. 2, an instruction packet designated by the reference numeral 200 is shown to comprise instructions 102a-d of cache line 102. Instruction packet 200 can be a VLIW packet as discussed above in some examples. FIG. 2 shows examples where bits of instruction packet 200 (e.g., unused bits or reserved bits repurposed as parity bits) can be used for parity. For instruction packet 200, assembler 152 may determine, if the parity of instruction packet 200 is already the predesignated parity (e.g., even or odd), and if so, store instruction packet 200 in memory 156, for example, without further modifications for parity. If the parity of instruction 200 is not the predesignated parity, then assembler 152 may use a bit of instruction packet 200 (e.g., an unused bit or a reserved field repurposed for designating parity) as a parity bit to make up the parity of instruction packet 200 to match the predesignated parity and store instruction packet 200 with the expected parity in memory 156. At any point where instruction packet 200 is tested for error correctness downstream (e.g., in parity check 114), if the parity of instruction 200 does not match the predesignated parity, then instruction packet 200 is determined to have an error.

If an error is determined in this manner, the error may be logged for future analysis, or an exception can be generated. Corrective actions following such error determination are not explained in detail in this disclosure, and any suitable action may be pursued. It will be appreciated that unused bits of instruction packet 200 which are used for parity may be ignored anyway (since they are unused), and so any modifications to these unused bits for making up the parity of instruction packet 200, would not affect the normal operation/execution of instructions 102a-d of instruction packet 200.

Several examples of bits of instruction packet 200 which may be used for parity will now be discussed. In one example, one of the instructions, e.g., instruction 102a may have one or more unused bits. For example, instruction 102a may have an encoding which does not require all bits available in the instruction space (e.g., 16 or 32 bits) available to instruction 102a. Bit 202 may be such an unused bit in instruction 102a. Assembler 152 may modify an unused bit to make the parity of instruction packet 200 match the predesignated parity if the parity of instruction packet 200 does not already match the predesignated parity.

In another example, assembler 152 may be able to take advantage of a reserved field for use as a parity bit. In this regard, unused encodings of instructions may be repurposed for use as a parity bit. For example, if there are three flavors of an instruction e.g., three flavors of a shift instruction, such as a logical shift right, an arithmetic shift right, and a shift left, then these three flavors may be distinguished based on three different encodings (e.g., "00", "01", and "10" of a 2-bit field in an operation code for shift instructions); but only one of these encodings have a "1" in the left or most significant bit position of the 2-bit field, which means that the right or least significant bit position of the 2-bit field may be repurposed for use in parity, when the most significant bit position is "1".

In another example, the assembler may realize that none of the instructions selected to form an instruction packet may have unused bits which may be used for parity. In such a case, the assembler may introduce a no-operation (NOP) as one of the instructions. The NOP may be a dummy instruction which does not get executed. As shown, instruction 102c may be created as NOP 204 in one example, where all bits of instruction 102c are essentially unused. Thus, any of the bits of instruction 102c can be used for parity in this case.

In some examples, encodings specific to VLIW packet formats, e.g., for designating size of instructions, number of instructions, instruction boundaries, etc., of instructions of a VLIW packet may be used by assembler 152 for creating a parity bit. Considering the representation of instruction packet 200 designated as VLIW packet 200a in FIG. 2, in the field for instruction 102a may be a prefix comprising information related to the instructions which follow, e.g., instructions 1-3 in the fields for instructions 102b-d. The prefix may include information to convey the number of following instructions in VLIW packet 200a, corresponding instruction lengths of instructions 1-3, etc., but may not require all available bits of instruction 102a to convey this information. Therefore, assembler 152 may be able to use one or more bits of the prefix for parity designation of VLIW packet 200a.

In the representation of instruction packet 200 as VLIW packet 200b, a different style of encoding is shown, wherein fields 204a-d of corresponding instructions 102a-d are used to indicate whether VLIW packet 200b keeps going ("K" for fields 204a-d), i.e., instructions of VLIW packet 200b are to follow the corresponding instruction, or whether VLIW packet 200b stops ("S" for field 204d). If two bits are available for each of these fields 204a-d, but in the above example, one bit may be sufficient to distinguish between the two possibilities (e.g., "K" or "S"), the other bit of one or more of fields 204a-d may be used by assembler 152 for parity designation of VLIW packet 200b.

Figure 3:
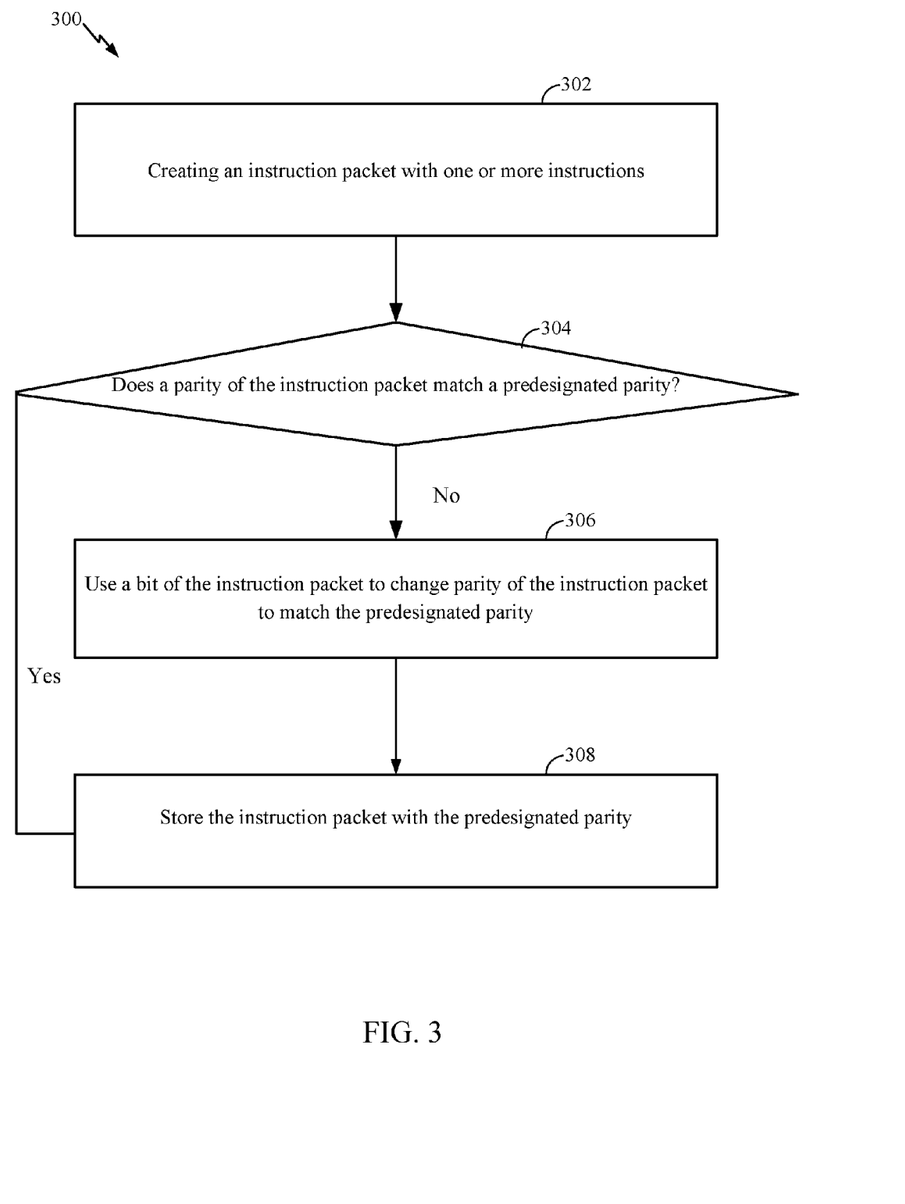
FIG. 3 illustrates a method of error checking for instructions according to an aspect of this disclosure.

Accordingly, it is seen that assembler 152 may use any one or more of the above options or combinations or variations thereof for creating a parity bit from an unused bit or repurposing a bit of instruction packet 200 for designating parity of instruction packet 200. Therefore, it will be appreciated that aspects include various methods for performing the processes, functions and/or algorithms disclosed herein. For example, as illustrated in FIG. 3, an aspect can include a method 300 of error checking for instructions (e.g., performed by assembler 152 for execution of the instructions in processor 110).

As shown, Block 302 can comprise creating an instruction packet with one or more instructions (e.g., creating instruction packet 200 comprising instructions 102a-d in assembler 152, wherein assembler 152 may be executed by the same processor 110 or by a different processor 150, without limitation, and wherein instruction packet 200 may be a VLIW packet).

In Block 304, method 300 can comprise determining if a parity of the instruction packet matches a predesignated parity (e.g., assembler 152 can determine if parity of instruction packet 200 matches a predesignated even or odd parity).

If in Block 304, it is determined that the parity of the instruction packet does not match the predesignated parity, then in Block 306, using a bit of the instruction packet to change parity of the instruction packet to match the predesignated parity. For example, assembler 152 may use a bit of instruction packet 200 (e.g., an unused bit, a bit of a NOP field, a reserved bit, etc.) as a parity bit to change parity of the instruction packet to match the predesignated parity.

In Block 308, the instruction packet is stored, e.g., in memory 156, with a parity which matches the predesignated parity (either after performing the step in Block 306, or by skipping Block 306 and reaching Block 308 from Block 304 if it is determined that the parity of the instruction packet already matches the predesignated parity).

From Block 308, method 300 may involve subsequent stages of storing instruction packet 200 in instruction cache 108, for example, and from there, being fetched, decoded, and executed in execution pipeline 112 of processor 110, for example. In any of these stages, parity of instruction packet 200 may be checked (e.g., by parity check 114 for IF, ID, EX1, EX2, WB, etc., stages of execution pipeline 112 of processor 110). If the parity does not match the predesignated parity, then an error is determined, which may be logged for future analysis, or an exception can be generated. Any appropriate corrective actions (beyond the scope of this disclosure) may also be implemented if an error is determined.

Figure 4:
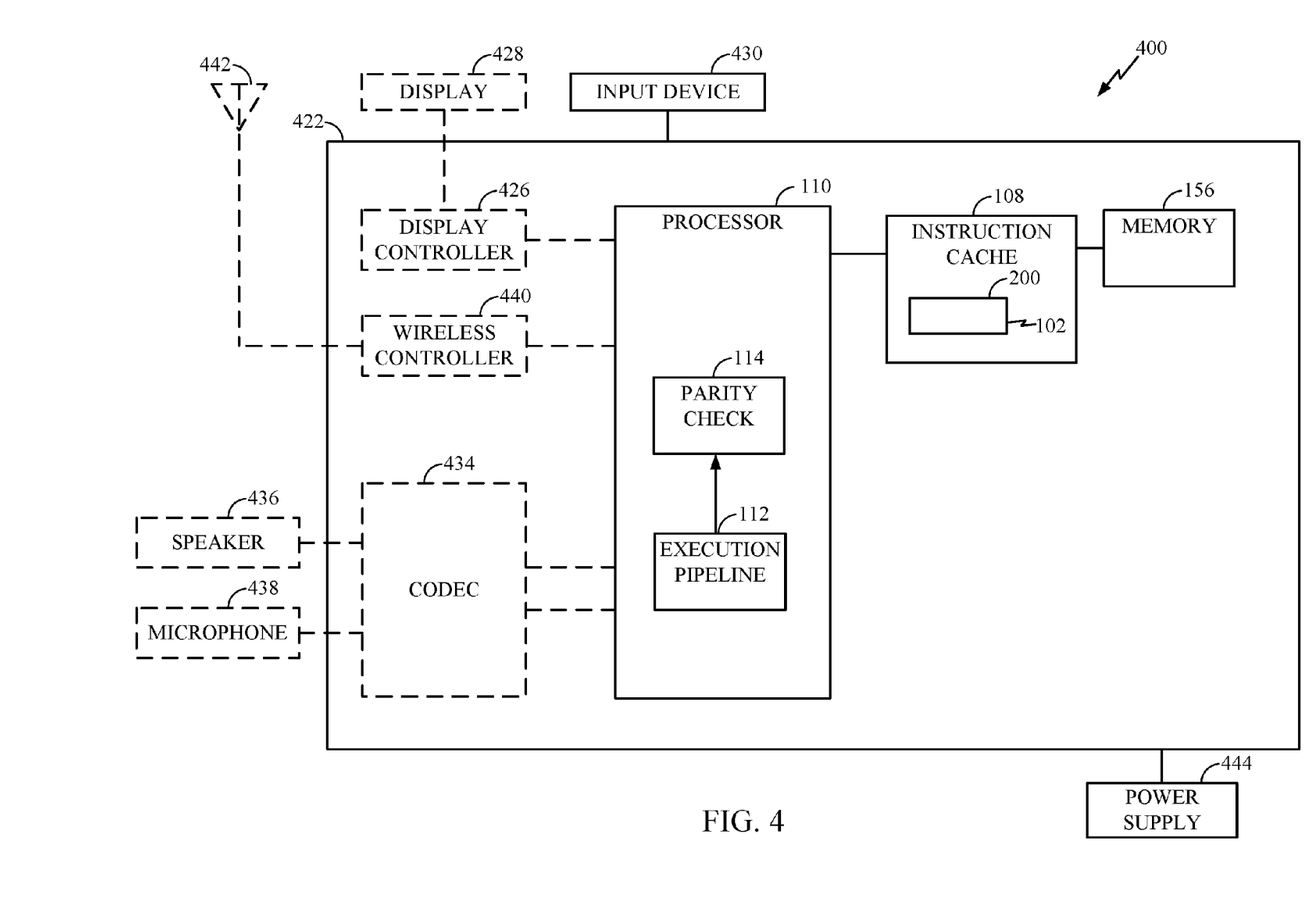
FIG. 4 illustrates an exemplary computing device, in which an aspect of the disclosure may be advantageously employed.

Referring now to FIG. 4, a block diagram of a computing device that is configured according to exemplary aspects is depicted and generally designated 400. Computing device 400 includes processor 110 of FIG. 1. In exemplary aspects, processor 110 may execute an assembler such as assembler 152 and be configured to perform method 300 of FIG. 3. Processor 110 may be communicatively coupled to memory 156, with instruction cache 108 representatively shown in between memory 156 and processor 110, as discussed with reference to FIG. 1. Execution pipeline 112 and parity check 114 are also shown in processor 110, although the details of execution pipeline 112 shown in FIG. 1 have been omitted from this view for the sake of clarity. Instruction packet 200 is shown in instruction cache, and may belong to cache line 102. Various other details, such as one or more caches and other interconnections which may be present between processor 110 and memory 156 have also not been illustrated in FIG. 4 for the sake of simplicity.

In some aspects, computing device 400 of FIG. 4 may be configured as a wireless communication device, such as a mobile device or user terminal. Thus, in some aspects, FIG. 4 may include some optional blocks showed with dashed lines. For example, computing device 400 may optionally include display 428 and display controller 426, with display controller 426 coupled to processor 110 and to display 428; coder/decoder (CODEC) 434 (e.g., an audio and/or voice CODEC) coupled to processor 110; speaker 436 and microphone 438 coupled to CODEC 434; and wireless controller 440 (which may include a modem) coupled to wireless antenna 442 and to processor 110.

In a particular aspect, where one or more of these optional blocks are present, processor 110, display controller 426, memory 432, CODEC 434, and wireless controller 440 can be included in a system-in-package or system-on-chip device 422. Input device 430, power supply 444, display 428, input device 430, speaker 436, microphone 438, wireless antenna 442, and power supply 444 may be external to system-on-chip device 422 and may be coupled to a component of system-on-chip device 422, such as an interface or a controller.

It should be noted that although FIG. 4 depicts a computing device (which may be used for wireless communications in some aspects, as noted above), processor 110 and memory 432 may also be integrated into a set top box, a music player, a video player, an entertainment unit, a navigation device, a personal digital assistant (PDA), a fixed location data unit, a computer, a laptop, a tablet, a communications device, a mobile phone, a server, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for error detection in instruction packets using parity bits. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of error checking for instructions, the method comprising:
   creating an instruction packet with one or more instructions;
   determining if a parity of the instruction packet matches a predesignated parity;
   if the parity of the instruction packet does not match the predesignated parity, using a bit within the instruction packet to change the parity of the instruction packet to match the predesignated parity; and
   storing the instruction packet with the predesignated parity in a memory.

2. The method of claim 1, further comprising determining if there is an error in the instruction packet retrieved from the memory, based on comparing the parity of the instruction packet to the predesignated parity.

3. The method of claim 2, further comprising determining there is an error in the instruction packet and generating an exception.

4. The method of claim 2, further comprising determining there is an error in the instruction packet and recording the error for analysis in a debugger.

5. The method of claim 2, comprising determining there is an error in the instruction packet during one or more pipeline stages including fetch, decode, one or more execution stages, or write back of the instruction packet in a processor.

6. The method of claim 1, wherein the instruction packet is a very long instruction word (VLIW) packet.

7. The method of claim 6, further comprising determining that the VLIW packet comprises less than a maximum possible number of instructions, inserting a no-operation (NOP) field in the VLIW packet, and using a NOP bit of the NOP field as the bit to change parity of the instruction packet.

8. The method of claim 6, wherein the bit belongs to a field of the VLIW packet, the field used for conveying information related to instructions of the VLIW packet.

9. The method of claim 1, wherein the bit is an unused bit of the instruction packet.

10. The method of claim 1, wherein the predesignated parity is one of an odd parity or an even parity.

11. An apparatus comprising:
    a processor configured to:
       create an instruction packet with one or more instructions;
       determine if a parity of the instruction packet matches a predesignated parity; and
       if the parity of the instruction packet does not match the predesignated parity, use a bit within the instruction packet to change the parity of the instruction packet to match the predesignated parity; and
    a memory configured to store the instruction packet with the predesignated parity.

12. The apparatus of claim 11, wherein a parity check block of the processor is configured to determine if there is an error in the instruction packet retrieved from the memory, based on a comparison of the parity of the instruction packet to the predesignated parity.

13. The apparatus of claim 12, wherein the processor is further configured to generate an exception if an error is detected.

14. The apparatus of claim 12, wherein the processor is further configured to record the instruction packet for future analysis in a debugger if an error is detected.

15. The apparatus of claim 11, wherein the instruction packet is a very long instruction word (VLIW) packet.

16. The apparatus of claim 15, wherein an assembler is configured to determine that the VLIW packet comprises less than a maximum possible number of instructions, and insert a no-operation (NOP) field in the VLIW packet, wherein a NOP bit of the NOP field is used as the bit to match the predesignated parity.

17. The apparatus of claim 16, wherein the bit belongs to a field of the VLIW packet, the field used for conveying information related to instructions of the VLIW packet.

18. The apparatus of claim 11, wherein the bit is an unused bit of the instruction packet.

19. The apparatus of claim 11, wherein the predesignated parity is one of an odd parity or an even parity.

20. The apparatus of claim 11 integrated into a device selected from the group consisting of a set top box, music player, video player, entertainment unit, navigation device, communications device, personal digital assistant (PDA), fixed location data unit, and a computer.

21. An apparatus comprising:
   means for creating an instruction packet with one or more instructions;
   means for determining if a parity of the instruction packet matches a predesignated parity; and
   if the parity of the instruction packet does not match the predesignated parity, means for using a bit within the instruction packet to change the parity of the instruction packet to match the predesignated parity; and
   means for storing the instruction packet with the predesignated parity.

22. The apparatus of claim 21, further comprising means for determining if there is an error in the instruction packet retrieved from the means for storing, based on a comparison of the parity of the instruction packet to the predesignated parity.

23. The apparatus of claim 22, further comprising means for generating an exception if an error is detected.

24. The apparatus of claim 21, wherein the predesignated parity is one of an odd parity or an even parity.

25. A non-transitory computer readable storage medium comprising code, which, when executed by a processor, causes the processor to perform a method of error checking for instructions, the non-transitory computer readable storage medium comprising:
   code for creating an instruction packet with one or more instructions;
   code for determining if a parity of the instruction packet matches a predesignated parity;
   if the parity of the instruction packet does not match the predesignated parity, code for using a bit within the instruction packet to change the parity of the instruction packet to match the predesignated parity; and
   code for storing the instruction packet with the predesignated parity in a memory.

26. The non-transitory computer readable storage medium of claim 25, further comprising code for determining if there is an error in the instruction packet retrieved from the memory, based on comparing the parity of the instruction packet to the predesignated parity.

27. The non-transitory computer readable storage medium of claim 26, further comprising code for determining there is an error in the instruction packet and code for generating an exception.

28. The non-transitory computer readable storage medium of claim 26, further comprising code for determining there is an error in the instruction packet and code for recording the error for analysis in a debugger.

29. The non-transitory computer readable storage medium of claim 25, wherein the bit is an unused bit of the instruction packet.

30. The non-transitory computer readable storage medium of claim 25, wherein the predesignated parity is one of an odd parity or an even parity.

* * * * *